March 26, 1940.    W. O. FULLERTON    2,194,933
SWITCHBOARD CORD REEL
Filed Dec. 16, 1938
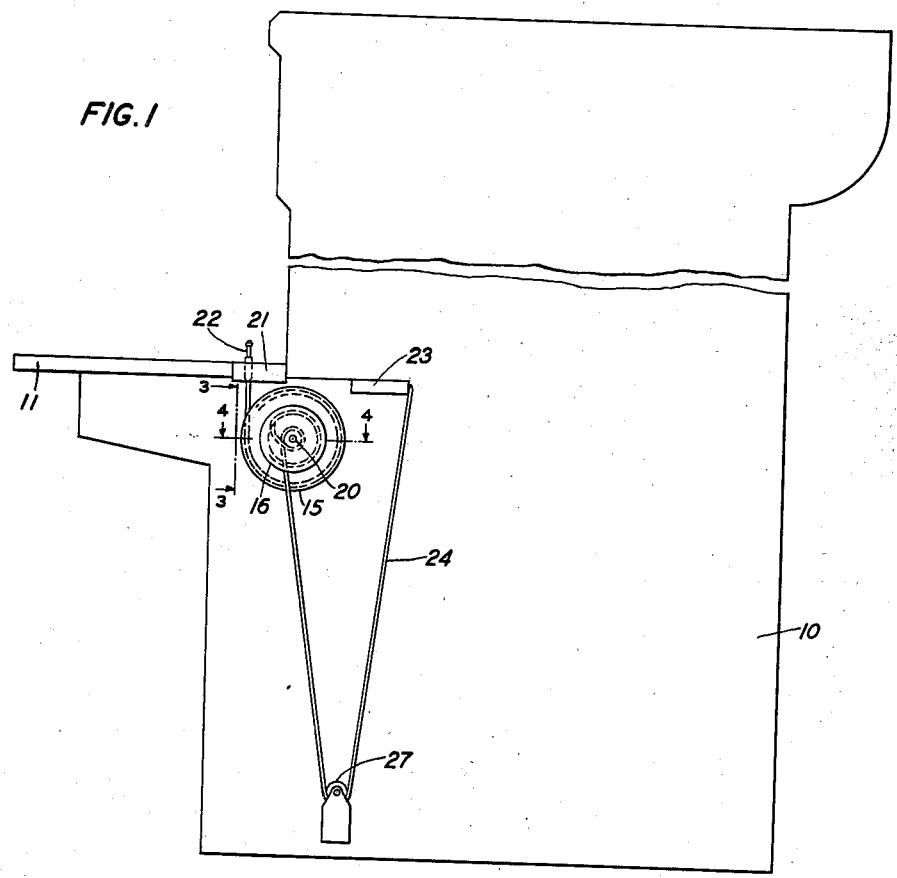
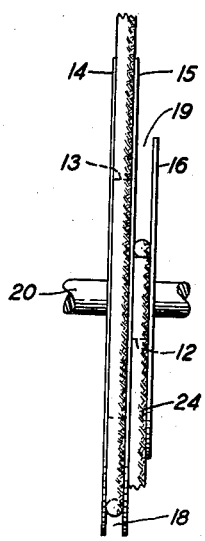
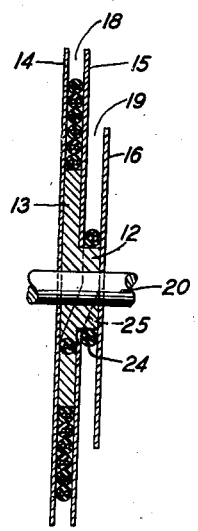
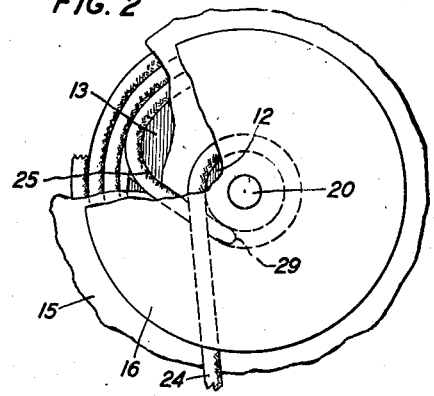
INVENTOR
W. O. FULLERTON
BY
ATTORNEY Patented Mar. 26, 1940

2,194,933

UNITED STATES PATENT OFFICE 2,194,933

SWITCHBOARD CORD REEL

William O. Fullerton, West Orange, N. J., assignor to Bell Telephone Laboratories, Incorporated, New York, N. Y., a corporation of New York Application December 16, 1938, Serial No. 246,117

11 Claims. (Cl. 179—95)

This invention relates to telephone switchboard equipment and particularly to cord disposal or take-up reels used generally for storing telephone cords.

It is the object of this invention to provide an improved means for storing telephone cords which renders practicable the use of cords of standard lengths with switchboards having key-shelves lower than those in common usage today.

This object is attained in accordance with a feature of the invention by employing a cord take-up device having a pair of cord storage reels of unequal diameters and so disposing the cord on the two reels that as one section of the cord is unwound from one reel, another section of the cord is wound upon the other reel. One of the reels is provided with an angular groove or duct which extends from a point on its hub periphery to a point adjacent the hub periphery of the other reel, thereby permitting the use of a continuous cord having one portion wound upon each reel and an interconnecting portion disposed within the groove or duct. A cord weight is associated with that portion of the cord which extends from the smaller reel to a point on the switchboard at which the cord end is fixed.

The invention will be readily understood from the following detailed description made with reference to the accompanying drawing in which:

Fig. 1 is a cross-sectional outline of a telephone switchboard showing the cord take-up device of this invention in position and illustrating the manner in which the cord is disposed on the two reel sections;

Fig. 2 is an enlarged fragmentary side elevation of the cord reel with certain portions broken away to disclose the relative sizes of the cord storage sections and the cord groove or duct interconnecting the two sections;

Fig. 3 is an enlarged front view of the reel taken along the line 3—3 of Fig. 1 looking in the direction of the arrows; and Fig. 4 is a section taken along the line 4—4 of Fig. 1 looking in the direction of the arrows.

In Fig. 1 the numeral 10 identifies a telephone switchboard having a key-shelf 11 whose vertical distance from the floor or base of the switchboard is less than standard. The key-shelf of the standard switchboard is located forty inches from the floor of the exchange in which the switchboard is located and accommodates the plug ends of a plurality of circuit completing cords, each of which is six feet in length. Fig. 1 of the drawing is intended to illustrate a key-shelf located thirty inches from the floor and equipped with a cord take-up reel of such construction as to permit the standard six-foot cords to be used.

The take-up reel of the present invention is of a double pulley-like construction having a pair of integral hubs or sections 12 and 13 rotatably mounted on a common shaft 20. Fixed to the double hub construction in any suitable manner are the guide plates 14, 15 and 16. The plates 14 and 15, and the hub section 13 form a reel having a cord storage space 18 defined by the periphery of hub 13 and the portions of plates 14 and 15 which extend beyond the hub 13. The plates 15 and 16 and hub 12 define a similar cord storage area 19.

As illustrated, the hub section 13 is greater in diameter than the hub section 12 and is provided with a slightly diagonal or angular bore or duct 25 which extends from the periphery of the hub 13 at an incline through the body of the hub 13 to a point 29. Due to its inclination the bore or duct will assume the nature of a groove or channel formed on the side of the hub 13 next to the plate 15. The plate 15 is provided with a corresponding opening which constitutes a continuation of the groove 25. The location of the outlet 29 of the groove 25 in plate 15 with respect to the periphery of the smaller hub 12 is so determined as to preclude the possibility of cord "humping" at that point.

The shaft 20 extends the length of the switchboard and rotatably supports a plurality of the cord take-up devices described above. The shaft is so positioned as to locate the cord reels immediately below and in back of the plug shelf 21 as shown in Fig. 1. The plug shelf, in accordance with well-known practice, is provided with a plurality of holes or plug seats in each of which a cord plug 22 is adapted to be removably housed.

The telephone cord 24 may be considered as consisting of two major portions, a plug end portion which is wound on the larger reel section 13 and a fixed end portion which is wound on the smaller reel section 12 and has its end fixed to the cord shelf 23, and an interconnecting portion which is disposed within the duct 25. The fixed end section carries a weighted pulley 27 as illustrated. The path of the cord may be traced from its fixed end, around pulley 27, over the smaller hub section 12 in a clockwise direction, through the duct 25 by way of the opening 29 in plate 15, and thence over the larger hub section 13 in several convolutions to its plug position in the plug shelf 21.

The cord disposal reel operates in the following manner: As the plug 22 is seized by an operator and plugged into a jack in the switchboard in the extension of a telephone connection, the cord is pulled through the plug seat causing the reel to rotate in a clockwise direction on its shaft 20. The cord portion wound on the larger hub section 13 starts to unwind. At the same time the cord portion suspended from the smaller hub section 12 starts to wind up on 12. The weighted pulley 27 suspended from the second cord section exerts a pull on the cord which, if the weight is heavy enough, causes the reel to turn in a counter-clockwise direction as soon as the plug end of the cord is released. The plug end portion of the cord will therefore rewind itself on the larger hub 13 and the portion on the smaller hub 12 will unwind.

The device is designed with one hub section of greater diameter than the other so that when the cord is pulled out by the operator, a greater length of cord will be unwound from the larger hub section or reel than is wound up on the smaller hub or reel. The reverse of this is true when the cord is released. As the plug end of the cord is pulled out, therefore, the cord weight will travel a relatively short distance in comparison to the length of cord withdrawn by the operator. By the proper selection of the ratio between the two hub diameters standard length cords can be stored in a relatively small space, thereby rendering their use with switchboards having low key-shelves practicable.

Though applicant has elected to illustrate his invention as applied to the storage of telephone switchboard cords, it is apparent that it is equally applicable to the storage of other types of electric cords. It will also be apparent that in its application to telephone switchboards the cord storage device may be mounted in the upper section of a switchboard in which the cord plugs are carried on the vertical face of the board instead of on the horizontal key-shelf with a helical spring anchored to the rear of the board to serve the purpose of the weight associated with pulley 27.

As stated hereinbefore, the cord may be considered as consisting of two major portions, one depending from the smaller hub and the other wound upon the larger hub and terminating in a plug. The general purpose and functioning of the device illustrated may be preserved by actually constructing the cord in two pieces and anchoring each to its respective hub and providing contact terminals for effecting the electrical continuity of the cord.

What is claimed is:

1. In combination, a switchboard cord storage device comprising a pair of integrally associated reels of different diameters arranged in adjacent parallel planes, one of said reels having a duct extending from the hub periphery thereof to a point adjacent the hub periphery of the other reel and a continuous cord having portions thereof wound in the same direction upon each of said reels and an interconnecting portion disposed in said duct.

2. In combination, a switchboard cord storage device comprising a pair of rotatable integrally associated reels of different diameters arranged in adjacent parallel planes, the larger of said reels having a duct therein extending from the hub periphery thereof to a point adjacent the hub periphery of said smaller reel and a continuous cord having a portion thereof wound in the same direction on each of said reels and an interconnecting portion disposed in said duct, the portion wound on said smaller reel having an end fixed to the switchboard and the portion wound on said larger reel terminating in a plug removably housed in the switchboard.

3. In combination, a switchboard, a rotatable cord storage device mounted on said switchboard and having a pair of integrally associated reels of different diameters arranged in adjacent parallel planes, one of said reels having a duct therein extending from the hub periphery thereof to a point adjacent the hub periphery of the other reel, a continuous cord having portions thereof wound upon each of said reels and an interconnecting portion disposed within said duct, one of said cord portions having its end fixed to said switchboard and a weight suspended from said last-mentioned portion at a point intermediate its fixed end and the reel upon which it is wound.

4. In combination, a device for storing a telephone cord comprising a pair of integrally associated reels rotatable on a common axis, one of said reels having a comunicating duct extending from its hub periphery to a point adjacent the hub periphery of the other of said reels, and a cord having a fixed end and a free end wound on both said reels and threaded through said duct in a continuous fashion, the free end of said cord adapted to be pulled to cause a portion of the cord associated with the free end thereof to be unwound from one of said reels and a portion of the cord associated with the fixed end thereof to be wound upon another of said reels.

5. In combination, a device for storing a telephone cord comprising a pair of integrally associated reels rotatable on a common axis, one of said reels having a communicating duct extending from its hub periphery to a point adjacent the hub periphery of the other of said reels, a cord having a fixed end and a free end wound on both said reels and threaded through said duct in a continuous fashion, and means comprising a weight suspended from said cord at a point intermediate its fixed end and one of said reels for causing said device to rotate whereby a portion of said cord is unwound from one of said reels and another portion is wound on another of said reels.

6. In combination, a device for storing a telephone cord comprising a pair of integrally associated reels rotatable on a common axis, one of said reels having a communicating duct extending from its periphery to a point adjacent the hub periphery of the other of said reels, a cord having a fixed end and a free end wound on both said reels and threaded through said duct in a continuous fashion, and means comprising a weight suspended from said cord at a point intermediate its fixed end and one of said reels for causing said device to rotate and cause a portion of the cord extending from its fixed end to be unwound from one of said reels and another portion of the cord extending from the free end to be wound upon another of said reels.

7. In combination, a continuous electric cord having a fixed end and a free end, and a rotatable device having a pair of reels upon each of which a portion of said cord is wound, said reels being so dimensioned that as the free end of said cord is pulled to unwind a predetermined length of cord from its respective reel, said other reel functions to take up a length of cord shorter than said predetermined length.

8. In combination, a continuous cord having a fixed end and a free end, and a rotatable device comprising a pair of reels upon each of which a portion of said cord is wound, said reels having different diameters so that as the free end of said cord is pulled to unwind a predetermined length of cord from the larger of said reels, the smaller of said reels functions to take up a length of cord shorter than said predetermined length.

9. A cord storage device comprising a rotatable member having two integral cord storage sections of different diameters arranged in adjacent parallel planes and having an intercommunicating duct in which a cord section interconnecting the cord portions stored on said storage sections is disposed.

10. In combination, an electric cord storage device comprising a rotatable member having a pair of integrally associated cord storage reels, said reels having hubs of different diameters, a cord wound upon the smaller of said hubs and having a depending portion and a cord wound upon the larger of said hubs and having a free end, said cords being so disposed upon their respective hubs that as the free end of said second cord is pulled to unwind a definite length of the cord from the larger hub a smaller length of the depending portion of said first cord is wound upon the smaller hub.

11. A cord storage device comprising a rotatable member having two integral cord storage reels, said reels having hubs of different diameters and one of said hubs having an angular bore extending from its periphery to the periphery of the other hub, and the two hub peripheries and said bore constituting a continuous guide for a cord.

WILLIAM O. FULLERTON.